Dec. 22, 1970         A. H. ROBERTS         3,549,454
                      WINDING MACHINES
Filed Dec. 20, 1967                      6 Sheets-Sheet 1
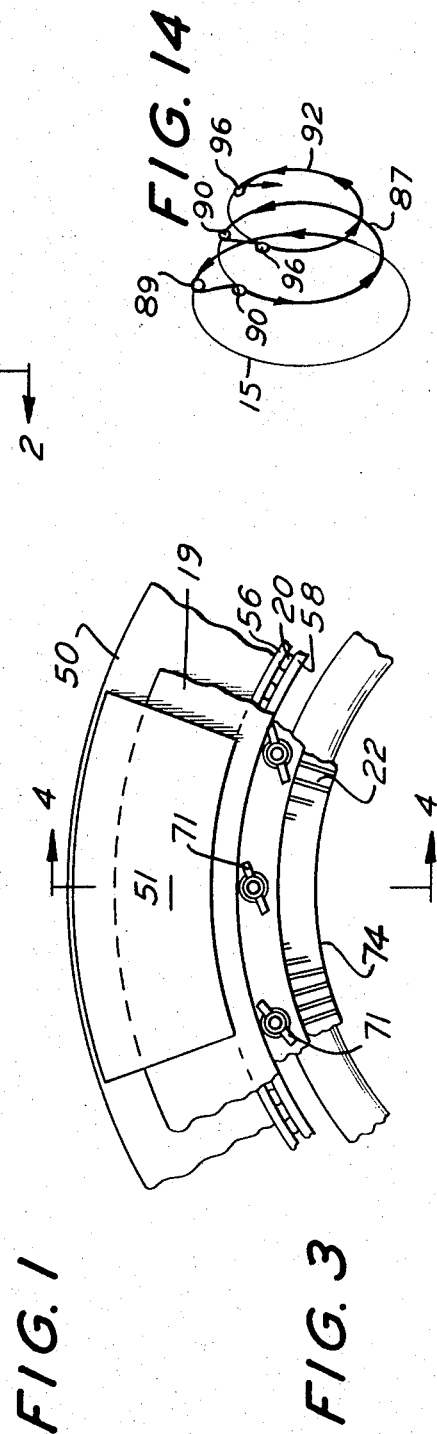
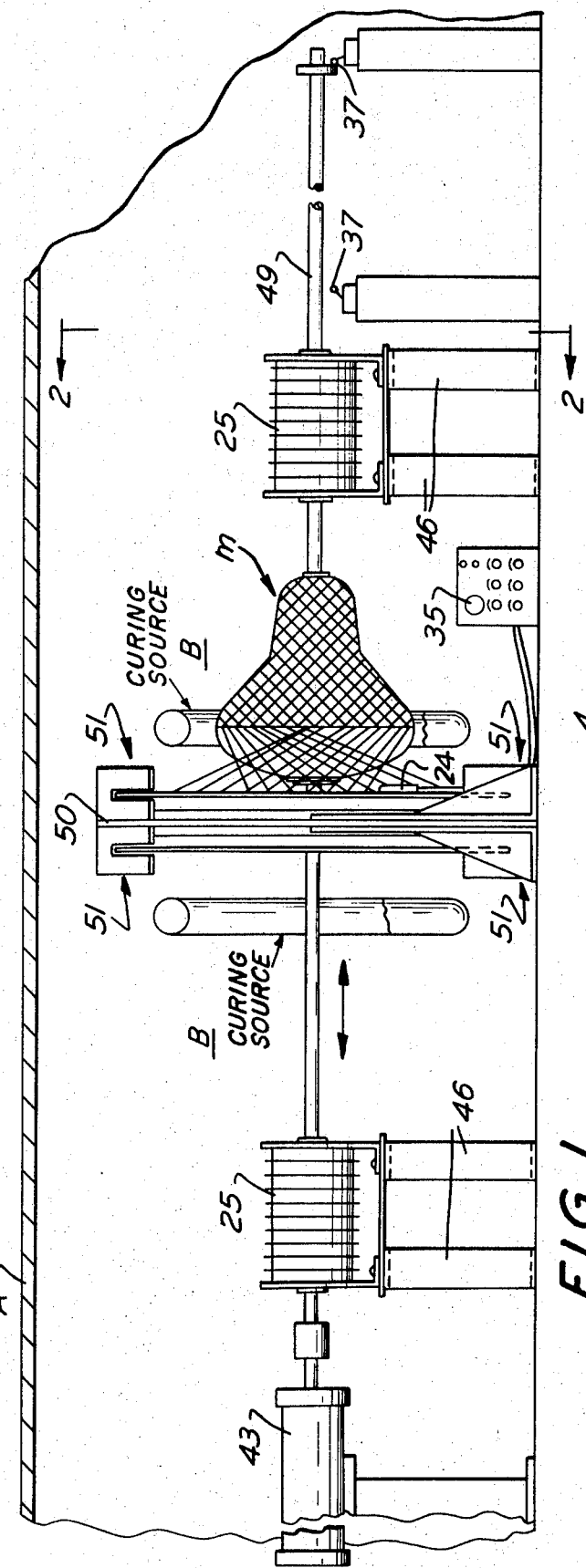
INVENTOR
ALFRED H. ROBERTS
BY
ATTORNEY Dec. 22, 1970   A. H. ROBERTS   3,549,454
WINDING MACHINES Filed Dec. 20, 1967   6 Sheets-Sheet 2

INVENTOR
ALFRED H. ROBERTS
BY
ATTORNEY

INVENTOR
ALFRED H. ROBERTS

BY
*B.T. Wobensmith*
ATTORNEY

Dec. 22, 1970  A. H. ROBERTS  3,549,454
WINDING MACHINES

Filed Dec. 20, 1967  6 Sheets-Sheet 5

INVENTOR
ALFRED H. ROBERTS

BY B. T. Wolsenmut
ATTORNEY

Dec. 22, 1970  A. H. ROBERTS  3,549,454
WINDING MACHINES
Filed Dec. 20, 1967  6 Sheets-Sheet 6
FIG. 13
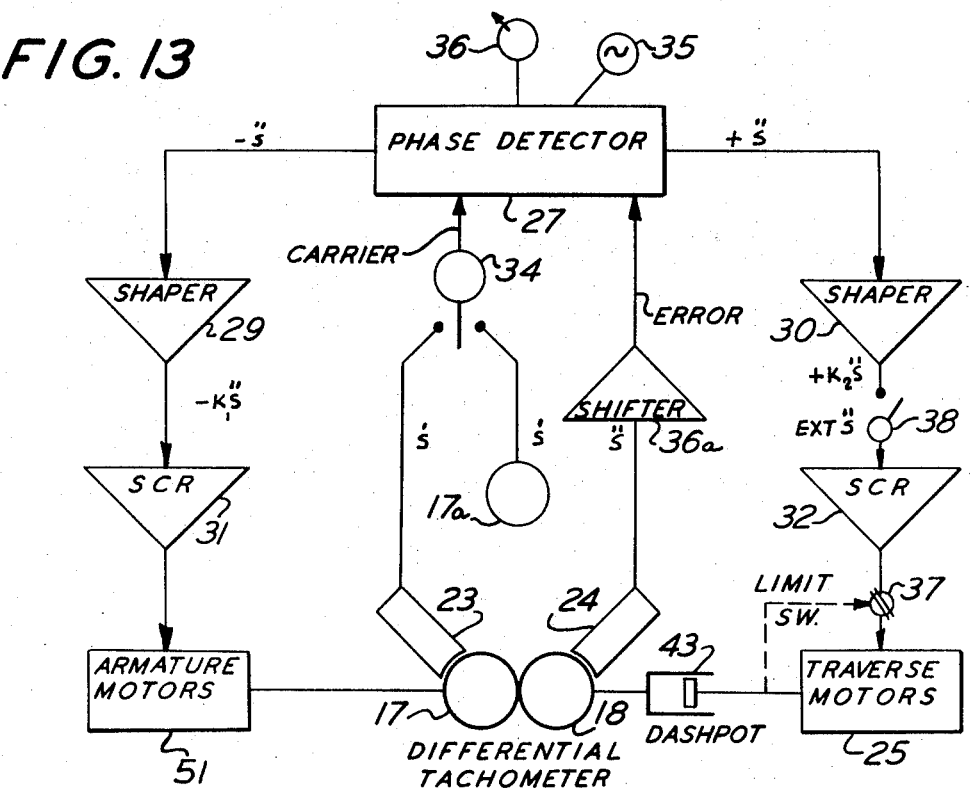
FIG. 15A  FIG. 15B
TRANSFER CHARACTERISTICS OF FEEDBACK AMPLIFIERS
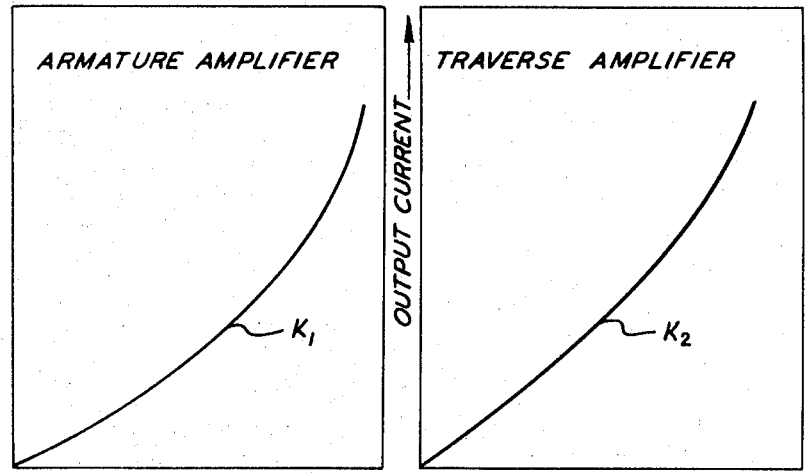
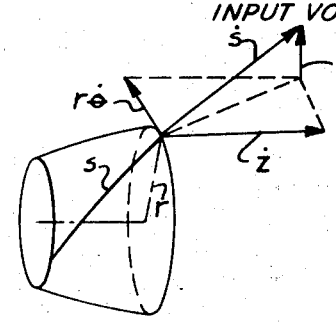
FIG. 16
INVENTOR
ALFRED H. ROBERTS
BY
ATTORNEY United States Patent Office
3,549,454
Patented Dec. 22, 1970

3,549,454
WINDING MACHINES
Alfred H. Roberts, 1615 Monk Road,
Gladwyne, Pa. 19035
Filed Dec. 20, 1967, Ser. No. 692,162
Int. Cl. B31c 9/00, 13/00; B65b 59/28
U.S. Cl. 156—425     10 Claims

ABSTRACT OF THE DISCLOSURE

Winding apparatus for applying a plurality of strands onto a mandrel from concentric annular armatures each carrying a supply reel, the traverse motion being controlled, and sensing means responsive to the linear velocity of the strands controlling, through feedback circuitry, the driving of the armatures and if desired, of the traverse. The environment may be controlled and curing or initiation of curing may be effected during strand application to the mandrel.

BACKGROUND OF THE INVENTION

Field of the invention

This invention relates to winding machines and more particularly to machines for winding impregnated or coated filaments or strands over mandrels in controlled patterns for curing.

Description of the prior art

There is a need in modern technology for lightweight hollow structures of maximum attainable strength, such as pressure vessels, aerospace frames and hulls of watercraft. These structures may be fabricated by filament winding, whereby strands of cohesive material are wound and cured over mandrels.

The apparatus now available for the construction of such lightweight hollow structures and incorporating strands in a desired pattern is either primitive or highly complex and leaves much to be desired.

SUMMARY OF THE INVENTION

In accordance with the invention, strands or filaments are wound onto a mandrel with even tension and without slippage of the strands and with control of the winding process in accordance with desired parameters. The technique is restricted to surfaces of revolution and axisymmetric polyhedrons and care must be exercised during winding to maintain even tension and to avert slippage of the strands.

It is an object of this invention to afford a method of and apparatus for fabricating high-strength hollow structures with a minimum expenditure of human effort.

It is a further object of this invention to improve uniformity of product by continuous correction of the winding geometry.

It is a further object of this invention to maximize the strength of the product by automatic equalization of tension among strands during the winding thereof.

It is a further object of this invention to reduce production costs by increasing the winding rate over that of existing machines.

It is a further object of this invention to provide continuous visual monitoring of the winding process.

It is a further object of this invention to provide, during winding, for adjustment of the width of the overall pattern, for varying the thickness of shells of revolution, and for adjusting the geometry of winding at polar openings.

It is a further object of this invention to provide for fabricating shells of revolution under vacuum, thus eliminating voids in the product.

It is a further object of this invention to provide, during winding, for irradiating the material in order to cure or set it as wound.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which:

FIG. 1 is a side elevational view of one preferred form of winding apparatus in accordance with the invention;

FIG. 3 is an enlarged fragmentary view in elevation of the upper portion of FIG. 2;

FIG. 13 is a diagrammatic view of the control system;

FIG. 14 is a stringing diagram illustrating the passage and control of a strand or filament;

FIGS. 15A and 15B are diagrammatic views showing the transfer characteristics respectively of the armature and traverse feedback amplifiers employed in FIG. 13; and FIG. 16 is a diagrammatic view of the vector resolution of winding velocity.

Figure 2:
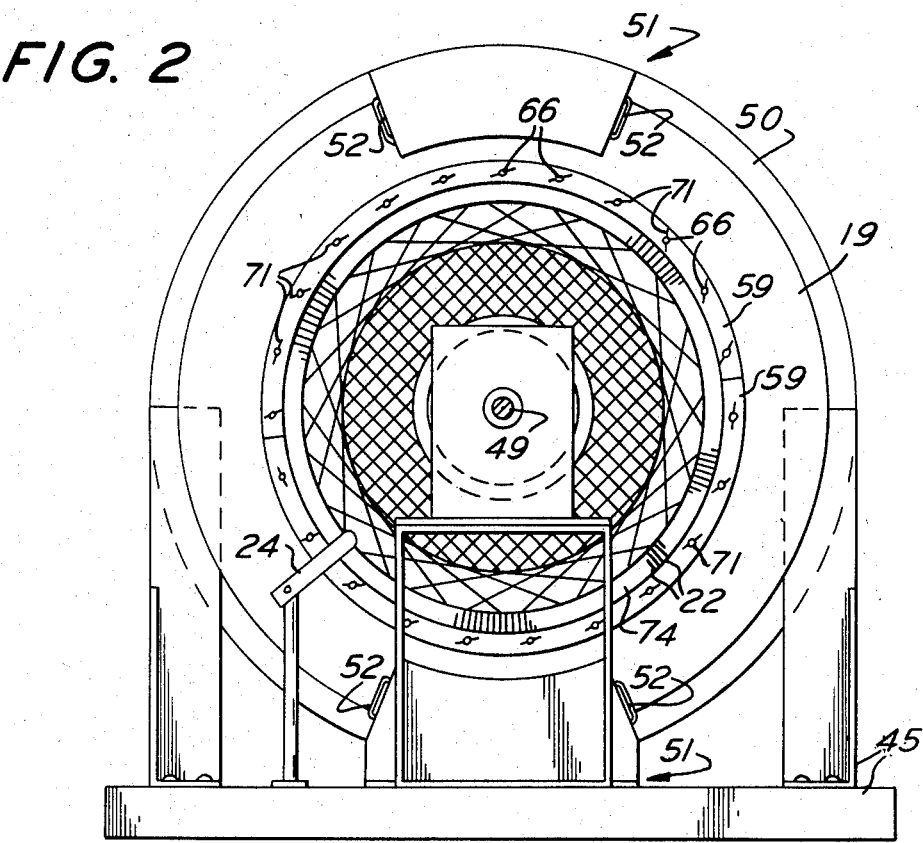
FIG. 2 is a transverse sectional view, enlarged, taken approximately on the line 2—2 of FIG. 1.
Figure 4:
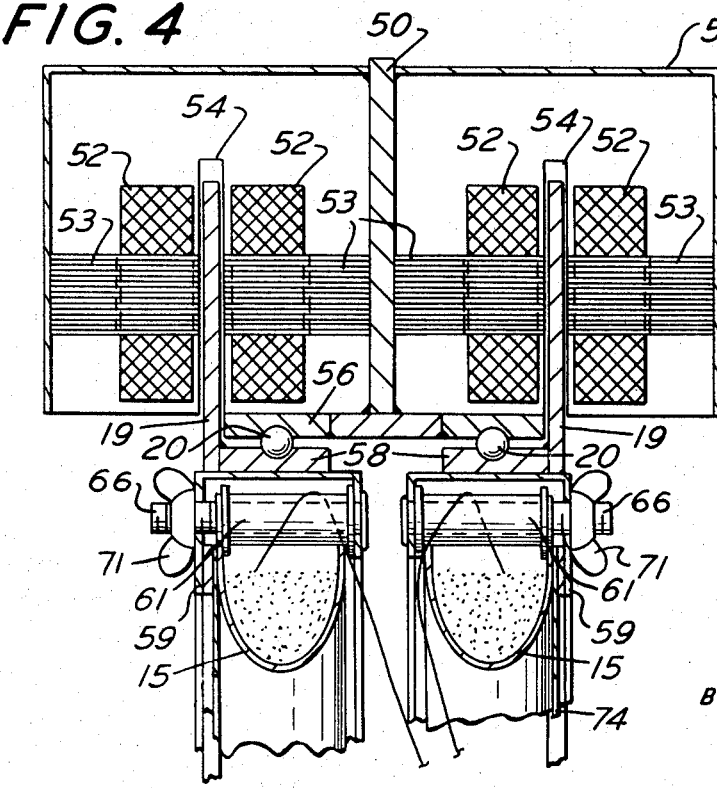
FIG. 4 is a partial sectional view, enlarged, taken approximately on the line 4—4 of FIG. 3.
Figure 5:
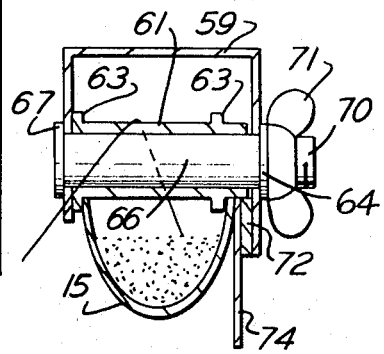
FIG. 5 is a view of a portion of FIG. 4, enlarged to show the details of construction.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Shells of maximum structural efficiency must exhibit uniform stress fields in three dimensions. In a filament-wound shell, this implies uniform winding tension within laminae and a gradual relaxation of winding tension from inner to outer laminae. The only known method of satisfying the first of these requirements is to lay each strand along a minimal path, i.e., a geodesic curve. This technique also averts the danger of slippage, which cannot be tolerated.

For cylinders and spheroids this requirement is satisfied by existing machines, although not at high speed. For other conoids and isotensoids the solution is more difficult. In accordance with the present invention the geometrical problem of achieving a minimal path is solved by a servomechanism.

The servomechanisms controls identically the rotations of a plurality of circular paired counter-winding armatures. Concentric with these, a mandrel is transported axially by a traverse mechanism. The resultant winding motion is helical. Each armature carries feed rollers arrayed peripherally. The rollers draw in both rotary directions about the mandrel a multiplicity of strands which in passage form hyperboloidal webs. There is one tensioning brake for each web. The mandrel, while constrained axially, is allowed to rotate. The result is equalization of tensions among strands and between webs and cancellation of opposing torques upon the mandrel.

A mathematical basis for the servomechanism operation may be found in the calculus of variations, wherein the Principle of Least Action is applied to the development of geodesic curves. Along a curve there is an "action" whose integral is to be rendered stationary for a geodesic. The "action" is the variation of the linear element of arc. Among the winding parameters here the linear element of arc is designated $\dot{S}$, a vector quantity representing the velocity of the tangent point of a strand at the mandrel during winding. The "action" is the variation in $\dot{S}$, i.e., the time derivative $\ddot{S}$. If $\ddot{S}$ is made to generate the error voltage, the error will tend in operation to zero; the web velocity at the same time will approach constancy and the winding path will become substantially geodesic. Further, with the disappearance of acceleration of the supply reel, inertia forces on the web will vanish. There will remain a braking tension which is substantially constant.

Referring now to FIG. 13, a functional diagram of the machine is shown. Power is applied separately (1) to rotary or armature motors and (2) to axial or traverse motors. In conventional automation technique, these motions would be programmed by an external device and negative feedback would enforce compliance with the program. In the apparatus of the present invention, the program or command signal is derived internally from the web velocity. Functionally, the apparatus of this invention is a nonlinear electromechanical oscillator, excited by a voltage arising in an impedance common to two branches of the network.

The load of winding against braking friction constitutes the common impedance. The power expanded in winding is the product of web tension and web velocity. It is well known that a feedback oscillator operating in the steady state consumes energy in the excitation branch sufficient only to sustain oscillation; i.e., the excitation power exemplifies the variational Principle of Least Action. In that sense, the oscillator is a null-seeking device. So it is with the apparatus of this invention: the servomechanism continuously seeks a minimum in the excitation energy; and that energy is expanded at a rate measured by the product of web tension and web velocity.

The machine in a symmetrical half of a preferred embodiment, such as that of FIG. 1 (with which are associated FIGS. 2 to 5) contains, as more fully described hereinafter a number of reels or rings concentric with the mandrel, each including a lightweight supply reel restrained by a brake. One supply reel 15 carries an annular braking disc 74 which is marked circumferentially and evenly with a series of timing marks shown at 22 in FIG. 2. The timing marks 22 are scanned for velocity and acceleration by scanning head 24 in FIG. 2. The output of the scanning head 24 is an alternating voltage of the order of 400 Hz. which is employed as an error signal designated $\ddot{S}$ (in FIG. 13.) By feedback circuitry, as hereinafter more fully explained, the A.C. error signal ($\ddot{S}$ in FIG. 13) is compared in a phase detector 27 with a reference voltage of the same average frequency; the resultant voltage is divided and employed, as indicated in FIG. 13, as a command signal for controlling the motion of the armatures and if desired of the traverse. In the embodiment shown in FIGS. 1 to 5 the reference voltage originates in a separate electronic oscillator shown at 17A in FIG. 13.

Figure 6:
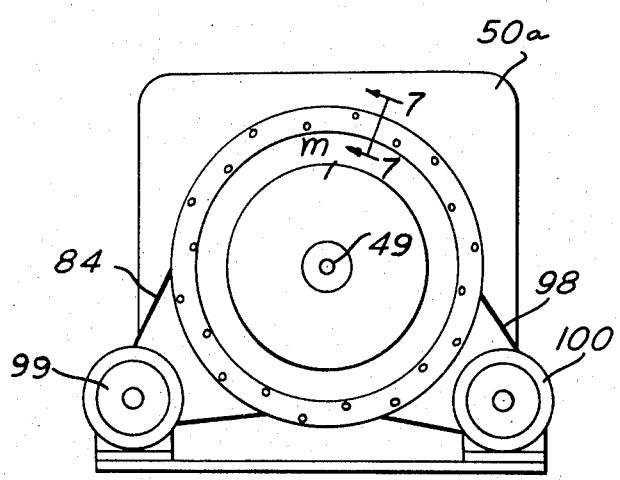
FIG. 6 is a view similar to FIG. 2 showing another preferred embodiment of the invention.
Figure 9:
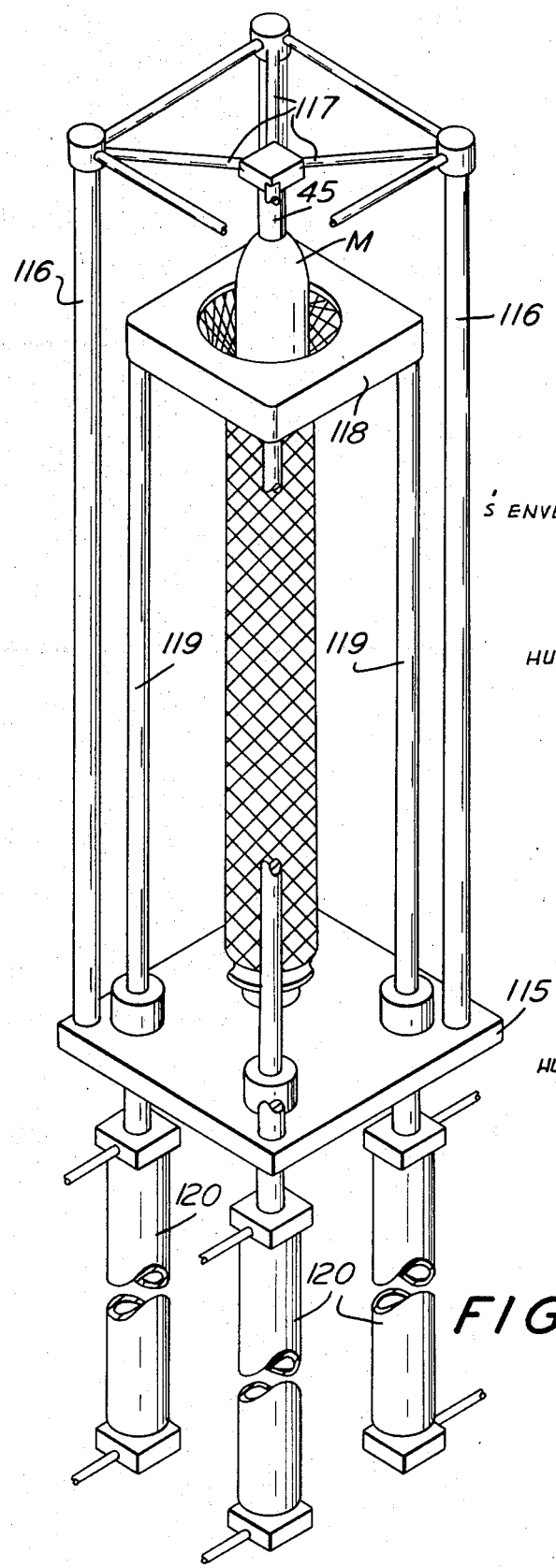
FIG. 9 is an isometric view of another preferred embodiment of the apparatus of the present invention.

In other preferred embodiments, shown in FIGS. 6 and 9, each pair of controlled armatures inculdes a master (scanned) armature and a slave armature. The reference voltage is generated by a second scanning head 23. The embodiments of FIGS. 6 and 9 contain, as hereinafter more fully described, a number of reels or rings concentric with the mandrel and including a supply reel with a restraining brake, a flywheel-pacer ring 17 around which one or more turns of the webs are taken, a phasing ring 18 around which one or more of the turns are taken, and an armature 19. This stringing is illustrated in FIG. 14. The armature 19 is driven, the others, including the flywheel-pacer ring 17 and the phasing ring 18 being slaves.

Two rotary motions are scanned. These velocities are first, that of the flywheel-pacer ring 17, and second, that of the phasing ring 18. The flywheel 17 is of substantial mass. The phasing ring 18 is as light as may be practical. Each of these two rings 17 and 18 is marked circumferentially and identically by a series of uniformly spaced timing marks 22. The marks are scanned by scanning heads 23 and 24 which sense the rotary velocities and convert them into alternating voltages of the order of 400 Hz. The signal from the pacer ring 17, in the electronic art, is called the carrier. The pacer ring 17, since it is inertia-controlled, yields a relatively steady frequency designated $\dot{S}$ which is a measure of web velocity. The phasing ring 18 will respond to changes in $\dot{S}$ caused by variations in the payout rate to the variable diameter of the mandrel. The scanner head 24 for the phasing ring 18, then, will generate an A.C. voltage designated $\ddot{S}$. This signal consists of $\dot{S}$ plus a phase modulation thereof (see FIG. 13).

Together, the pacer ring 17, phasing ring 18 and scanning heads 23 and 24 constitute a differential tachometer.

The signals $\dot{S}$ and $\ddot{S}$ are compared in a phase detector 27, as shown on FIG. 13, from which two electrical outputs are derived in opposite polarity. To the feedback look for the actuator 51 of armature 19 the negative error signal designated $-\ddot{S}$ is fed. To the feedback loop for the traverse motor 25 the positive error signal designated $+\ddot{S}$ is fed. These connections cause the phasing ring 18 and armature 19 to accelerate and decelerate in antiphase, whereas the phasing ring 18 and traverse motor 25 will accelerate and decelerate in like phase.

Next in each feedback loop are nonlinear amplifiers numbered 29 and 30 on FIG. 13. These amplifiers are to compensate for kinematic nonlinearities existing among the velocity $\dot{S}$ and its three cylindrical components, shown in FIG. 16 as $\dot{Z}$ (axial), $\dot{r}$ (radial) $\dot{r}\,\theta$ (circumferential), $\theta$ being the symbol for armature rotation. The transfer characteristics of the two shaper amplifier are illustrated in FIGS. 15A and 15B. The armature amplifier is seen to have an exponential curve, compensating for the second degree relationship.

$$\frac{r^2 \dot{\theta}}{\dot{S}} = \text{constant}$$

which must be observed in order to wind along a geodesic on a surface of revolution. The armature transfer characteristic designed $k_1$, in FIGS. 15A and 13 is approximated, for example, by the common twin-triode 12AU7 when driven by a large signal, as well as by a number of solid-state squaring circuits. In the traverse feedback loop, the desired characteristic, designated $k_2$ in FIGS. 15B and 13, is hyperbolic, whereas $k_1$, is parabolic.

The effect of these nonlinear amplifiers 29 and 30 is to reduce to a minimum the error voltage $\ddot{S}$ required for accurate winding.

Power amplifiers 31 and 32, preferably of the silicon control rectifier type, may also be provided in the two feedback loops. In addition, reversal of traverse motion is required. This may be accomplished by employing a push-pull traverse power amplifier 32 and driving it into cutoff at either end of the traverse excursion.

The phase detector 27 may have an oscilloscope 35 connected thereto for continuous visual monitoring of its operation and also an electrical pitch control 36 governing armature motion relative to traverse motion.

It is advantageous particularly for steady operating conditions to have the reference oscillator 17A available for carrier signal input to the phase detector 27 with alternative switching by switch 34 to carrier signal input from the scanning head 23.

Optionally, the traverse may be programmed externally over all or part of its cycle, particularly when more than one pair of armatures is operated. In FIG. 13, provision is shown for traverse limit-switching by switch 37 and an open connection 38 is provided for external programming. In addition, a dashpot 43 may be employed for modification of the motion near the end of travel. The reason for this is pointed out below, but reference will first be had to the specific structure of a preferred embodiment of the invention.

Referring now to FIGS. 1 to 5, inclusive, an enclosure A is provided so that the desired controlled environment can be made available and maintained. The environment may have the desired humidity, gaseous content, pressure or vacuum, or temperature in accordance with the requirements of the particular process of impregnating and curing the rovings to be wound.

If desired, also, for purposes of curing, infrared or ultraviolet wiring sources B of annular configuration may also be mounted so that the mandrel and the strands being wound thereon advance therethrough in the longitudinal axial travel for curing, or initiation of curing during the winding operation.

A frame 45 is provided having spaced uprights 46 which support traverse operator motors 25 of any desired type for reciprocating a shaft 49 along its axis with a controlled movement. The shaft 49 carries a mandrel M, and the dashpot 43 may be provided at one end. The traverse motors 25 may be linear actuators such as are manufactured by V. B. Actuators, Inc., Las Vegas, Nev.

Figure 11:
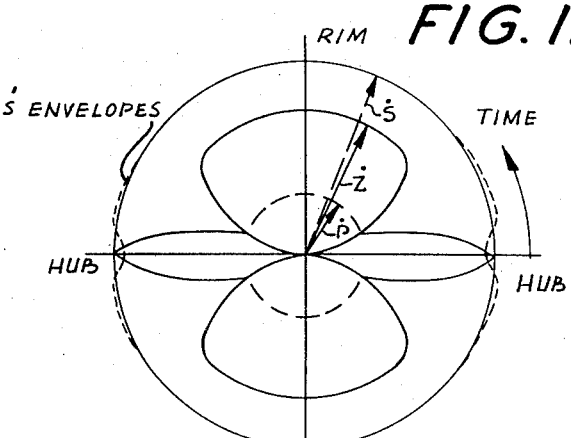
FIG. 11 is a polar diagram showing peripheral and axial velocities where the mandrel is a cylindroid.
Figure 12:
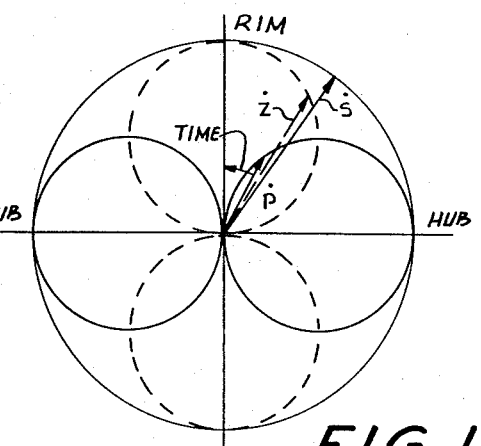
FIG. 12 is a polar diagram showing rotary and axial velocities for winding a meridial hoop.

For cylindrical helical winding, a uniform axial traverse movement would be employed. For spherical winding a sinusoidal movement would be imparted to the traverse, while for a cone there must be even acceleration in one axial direction with even deceleration in the opposite direction. Other movements as required could also be employed as indicated in FIGS. 11 and 12.

The external shape of the mandrel M is determined by the article to be wound, and the mandrel M can be of any desired internal construction to accommodate the pressure applied by the strands during winding and/or during subsequent curing. The mandrel M can be inflatable, segmental and collapsible, as required, and can also be soluble or readily meltable for removal.

A frame ring 50 preferably has mounted thereon one or more electromagnetic actuators 51 with one or more pairs of spaced windings 52, having cores 53 with armature slots 54 for the reception therebetween of disc armatures 19. The frame ring 50 carries an outer ring 56 of spaced radial ball bearings 20. The inner ring 58 of each bearing 20 is carried on the periphery of semicircular distributor channels 59. The channels 59 are separable along a diametrical plane for removal.

The channels 59 have interiorly disposed therein supply reels 15 in which the strands are carried for delivery over payout rollers 61. The payout rollers 61 have end flanges 63 and are carried on pins 66 which have heads 67 engaging the channels 59 and threaded ends 70 for engagement by adjustable tension wing nuts 71 which also engage washers 64 bearing on the channels 69 on the opposite side from the heads 67.

Brake discs 74 carried by supply reels 15 also carry stroboscopic uniformly spaced timing marks 22 for scanning by the scanning head 24. The payout rollers 61 thus serve as reel bearings for reels 15 and take up sleeves for braking. The supply reels 15 are pulled by the strands being paid out and restrained by the braking action of the brake discs 74 against shoes 72.

Figure 7:
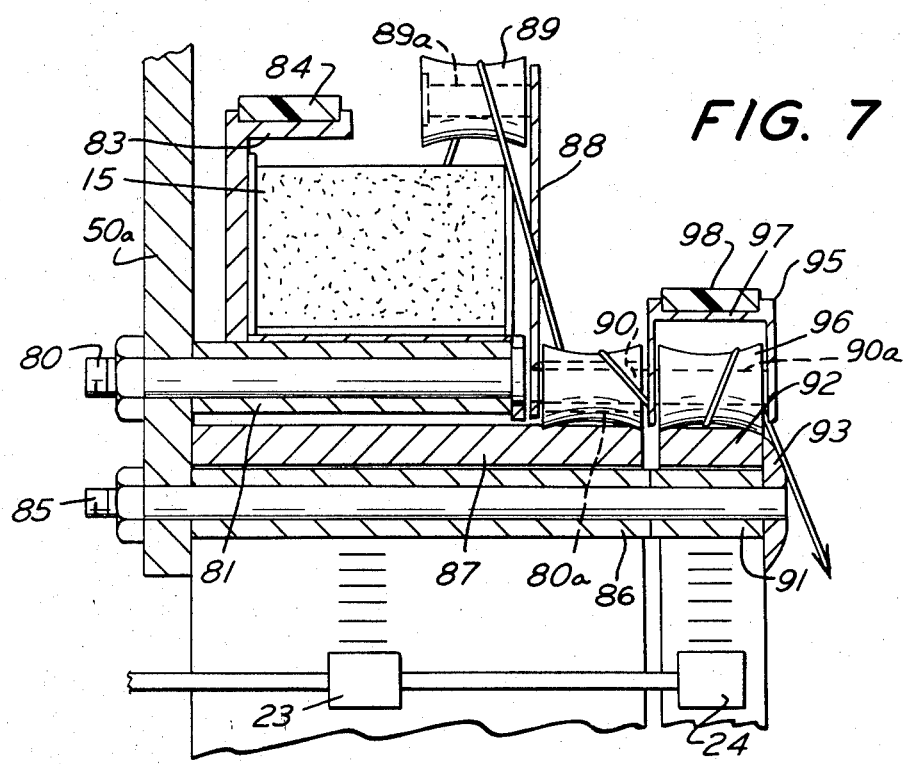
FIG. 7 is a fragmentary longitudinal sectional view, enlarged, taken approximately on the line 7—7 of FIG. 6.
Figure 8:
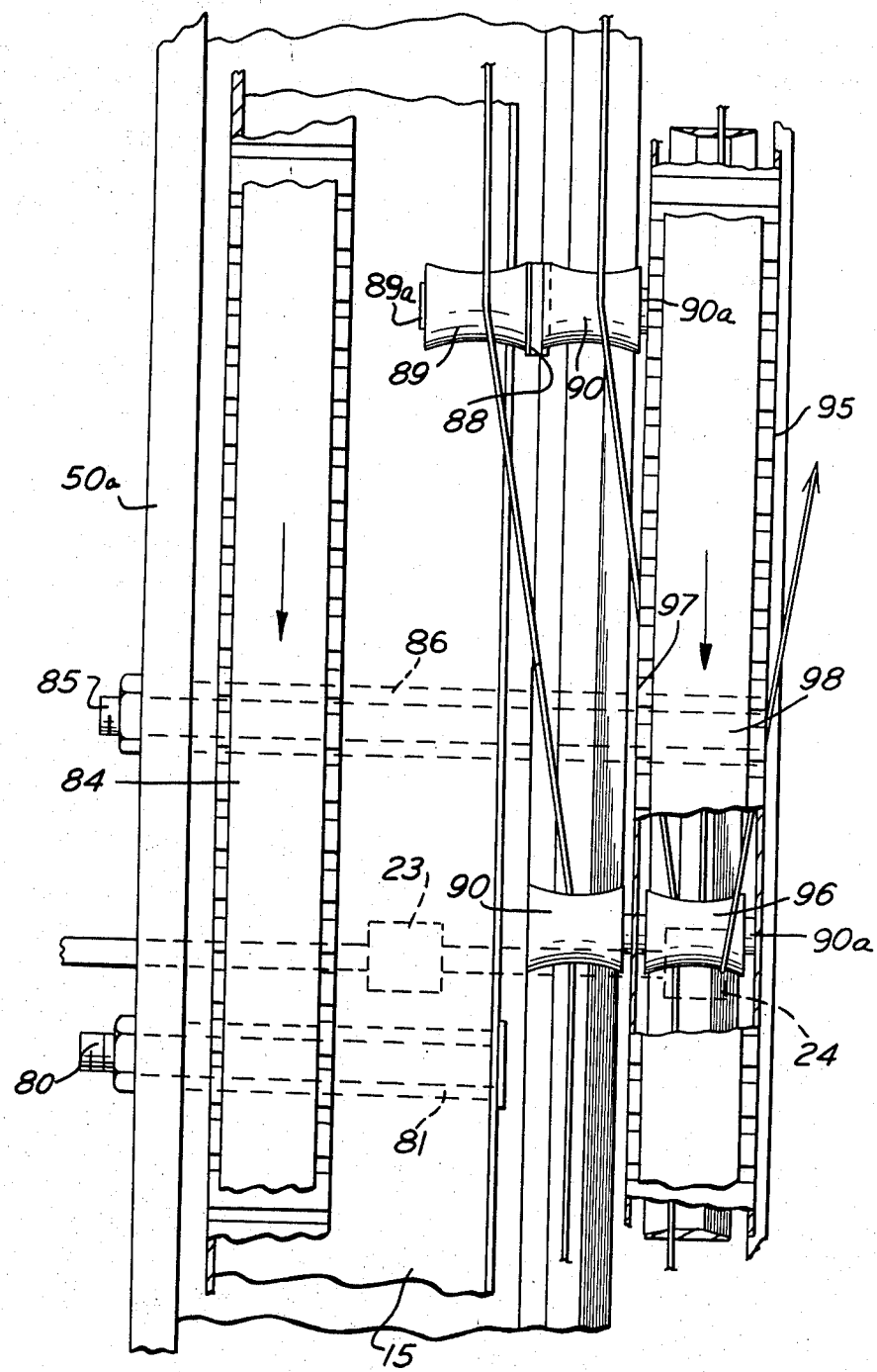
FIG. 8 is a fragmentary elevational view of a portion of the structure shown in FIG. 7.

Referring now to FIGS. 6, 7 and 8, the structure there shown can be provided, as before, with an enclosure A and sources B but these have been omitted in the interest of clarity.

A frame ring 50a is provided with shafts 80 secured thereto, the shafts 80 carrying bearings 81 which support supply reels 15. The reels 15 have circumferential belt rims 83 for engagement of a braking belt 84, which can be of conventional notched timing belt construction.

The frame ring 50a also has shafts 85 carrying bearings 86 on which the pacer ring-flywheel 87 is carried. A mounting plate 88 is provided on which pickoff guide rolls 89 are supported on shafts 89a which carry the plates 88 and shafts 90a on which transfer rolls 90 are carried. The transfer rolls 90 on shafts 90a have interposed resilient sleeves 80a to provide a small compliance at this location to take up variations in tension. The shafts 85 also carry bearings 91 on which a phasing ring 92 is carried and end guide rings 93.

Associated with the phasing ring 92 and movable therewith a channel 95 is provided carrying roving guide rolls 96 and having an outer peripheral driving belt rim 97 with which a driving belt 98 preferably also of conventional notched timing-belt construction, is engaged.

The braking belt 84 (see FIG. 6) is preferably engaged with a pulley (not shown) on an eddy current brake 99. The driving belt 98 is preferably engaged with a pulley (not shown) on a driving motor 100, the energization of which is controlled in the manner previously referred to in connection with the actuator 51 of armature 19.

A scanner 23 is preferably provided for stroboscopic scanning of the movement of the pacer ring-flywheel 87 and a scanner 24 is preferably provided for stroboscopic scanning of the phasing ring 92. The scanning may be optical, magnetic or otherwise.

The take off of roving is illustrated particularly in FIG. 14 in which a braked supply reel 15a has roving taken therefrom, with a floating inertial pacer ring at 87a which is scanned for $\dot{S}$, and a variably accelerated phasing ring 92a which is scanned for $\ddot{S}$.

Referring now to FIG. 9, another embodiment of the invention is illustrated in which the mandrel M is vertically disposed in place of being horizontally disposed in the embodiments previously described. A horizontal frame 115 supporting the lower end of the mandrel M has posts 116 extending upwardly therefrom with cross braces 117 to support the upper end of the mandrel M. A traverse housing 118 is provided with roving supply, servo control heads and motors therein, as previously described for FIGS. 6, 7 and 8.

The traverse housing 118 is positioned by piston rods 119 connected to pistons (not shown) in servo controlled hydraulic hoists 120 which provide the desired traverse motion.

Figure 10:
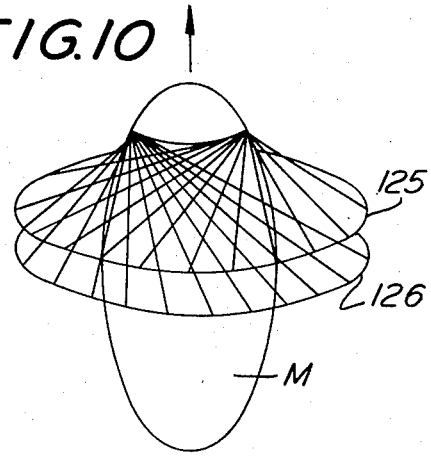
FIG. 10 is a diagrammatic isometric view showing the formation of an iris of winding such as may occur at an end.

In FIG. 10, the counter winding to provide an iris opening inwardly at the end of ellipsoidal mandrel M is illustrated, with two roving supply sources 125 and 126. The upper source 125 is shown as moving clockwise and the lower source 126 is shown as moving counterclockwise with the respective webs tangential to the mandrel M.

FIG. 11 is a polar diagram of the peripheral $r\theta$ and axial ($\dot{Z}$) velocities with a cylindrical mandrel M having spherical ends. The actual value of $\ddot{S}$, indicating acceleration, is dotted.

FIG. 12 is a polar diagram of rotary ($\theta$) and axial ($\dot{Z}$) velocities for winding a meridial hoop, $\dot{S}$, i.e., the variation in $\dot{S}$, not being shown, $\dot{S}$ being assumed constant.

FIG. 16 is a diagrammatic view in perspective showing the geometrical relationship of a strand S on a mandrel M at a selected location having a radius $r$, radial velocity $\dot{r}$, axial velocity $(\dot{Z})$, rotary velocity $(\dot{\theta})$ and winding velocity $(\dot{S})$.

It will thus be seen that a winding machine has been provided with accommodation to a wide number of variables, not only in the shape of the mandrel and the control of the traverse but in the control of the roving.

The pitch and consequently the pattern width may be varied electrically (a) by voltage division of the phase detector output, (b) by varying the gain controls of the armature and traverse amplifiers, (c) by shifting the time phase of the error signal, (d) by adjustment of the cut-off bias of the traverse amplifier along with (e) limit switching on the traverse. The optimum settings will be those producing the least root-mean-square error voltage.

The present machine has the ability to start up without fouling and with a minimum of make-ready. At starting preloaded supply reels 15 are inserted. Each strand to be wound is threaded and passed around pickoff and payout rollers as shown in threading diagram FIG. 14 and tied to an oppositely disposed strand of the other reel, the slack being taken up uniformly. The mandrel M is positioned so that a cylindrical band lies in the armature plane. The traverse motion is initially set at zero.

The two armatures are first rotated slowly. Since they turn in opposite directions the paired strands will be pulled taut. The result is the formation of an iris (see FIG. 10) at the junction of the two webs, somewhat as in a purse net. This iris will close about the stalled mandrel M and begin to wind a narrow circular band. The mandrel motion is then gradually increased by means of the pitch control together with the armature speed until the desired operating conditions are attained and winding is continued until completed or until replenishment of roving is required.

Some of the shells to be fabricated will have polar openings of unequal diameter. On a spheroid such dissymmetry destroys geodesicity. Consequently, for high-pressure vessels, the shape is often flattened at one pole to form a geodesic isotenoid (see U.S. Patent No. 3,121,451 to Schuerch).

For some shapes it may not be possible to wind a complete geodesic. The geodesic curvature in many instances, however, can be confined to the neck area, where winding would be at a maximum thickness about a polar pressure fitting. The deviation can be accommodated by shifting phase of the error signal, by limit switches and dashpots at the ends of the traverse motion as these can be employed to inhibit travel in that region while neck and shoulder portions of the mandrel are being overwound.

For the purpose of distorting the geodesic pattern so as to compensate for unequal polar openings, a phase shifting network may be inserted in the error-signal path or loop as shown at 36a in FIG. 13.

It is inherent in the winding operation that the degree of overlay, and with it the shell thickness, varies inversely as the mandrel diameter. The avoidance of this difficulty lies in the ability to widen or narrow periodically the longitudinal pattern being wound and in the rate at which the correction is applied. The rolloff parameter may be calculated according to the structural requirements of the shell, and the correction may be applied either by hand or by external program.

Axisymmetric polyhedrons may also be wound, provided the number of feedpoints on the armatures corresponds with the number of polyhedral faces. For example, if each armature carries twenty four payout rollers and each reel is preloaded with twenty four parallel strands or a multiple thereof, the web may be composed of twenty four times one strand, twelve times two, eight times three or six times four strands, one grouping for each face of the mandrel. By this arrangement, for example, a hexagonal polyhedron could be wound and a semihexagonal boat hull cut lengthwise from it.

I claim:
1. In a winding apparatus
    a mandrel,
    means for directing strands about said mandrel, said means comprising coaxial annular armatures each having a supply reel,
    sensing means responsive to the linear velocity of the strands and providing a signal,
    brake means for said supply reels,
    a traverse mechanism for controlling the relative longitudinal axial movement of said mandrel,
    driving means for said armatures,
    driving means for said traverse mechanism, and
    feedback means for transmitting said signal and controlling said driving means.
2. A winding apparatus as defined in claim 1 in which said armatures are paired and counter-rotated,
    means is provided for free rotation of said mandrel under tension of the strands, and
    adjusting members are provided for said brake means.
3. A winding apparatus as defined in claim 1 in which said feedback means includes amplifiers having gain characteristics which are nonlinear with amplitude, the nonlinearity minimizing the signal required to control said driving means.
4. A winding apparatus as defined in claim 1 in which said feedback means includes components for varying the helical angle of winding by electrical division of the voltage available to said driving means.
5. A winding apparatus as defined in claim 1 in which said feedback means includes components for varying the helical angle of winding by electrically shifting the time phase of signals from said sensing means.
6. A winding apparatus as defined in claim 1 in which a limit switch is provided effective at the end of traverse movement for modifying the action of said feedback means.
7. A winding apparatus as defined in claim 1 in which dashpot means is provided effective at the end of traverse movement for modifying the action of said feedback means.
8. A winding apparatus as defined in claim 1 in which external signal input means is provided for controlling the action of said traverse mechanism.
9. A winding apparatus as defined in claim 1 in which an environmental controlling enclosure is provided about said mandrel and said directing means.
10. A winding apparatus as defined in claim 1 in which means is provided for irradiating the mandrel and the strands from said directing means.

References Cited

UNITED STATES PATENTS

| | | | |
|---|---|---|---|
| 3,130,928 | 4/1964 | Daley | 242—2 |
| 3,133,236 | 5/1964 | McCauley | 242—2 |
| 3,255,976 | 6/1966 | Mede | 242—2 |
| 3,367,586 | 2/1968 | Eshbaugh | 242—2 |
| 3,448,253 | 6/1969 | Bramblett II et al. | 242—2 |

BENJAMIN A. BORCHELT, Primary Examiner

T. H. WEBB, Assistant Examiner

U.S. Cl. X.R.

156—162, 170, 431